Aug. 15, 1933.   W. VOITH   1,922,606
METHOD AND MEANS FOR PROPELLING AND STEERING WATER OR AIR SHIPS
Filed Sept. 22, 1931   3 Sheets-Sheet 1
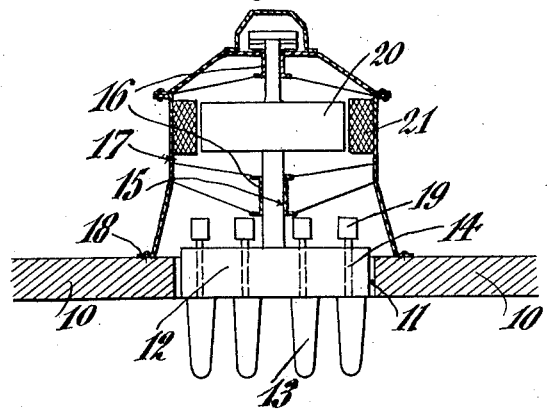
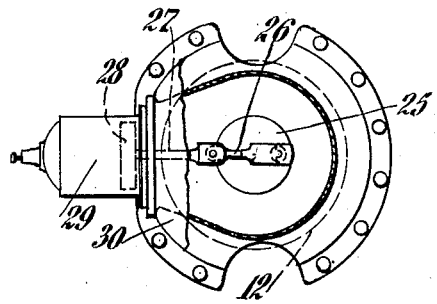
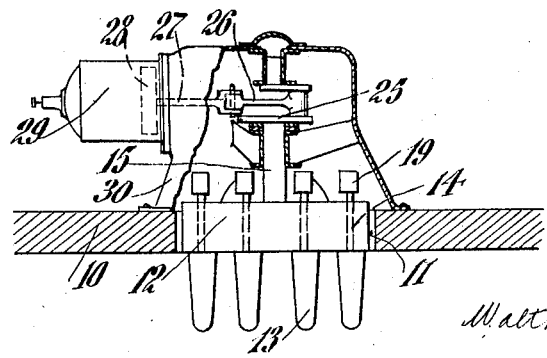
INVENTOR
Walther Voith
BY C. P. Goepel
his ATTORNEY.

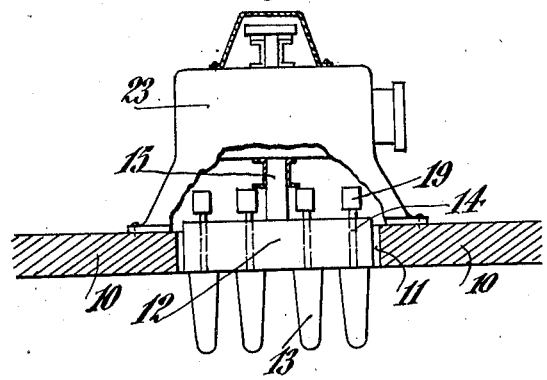
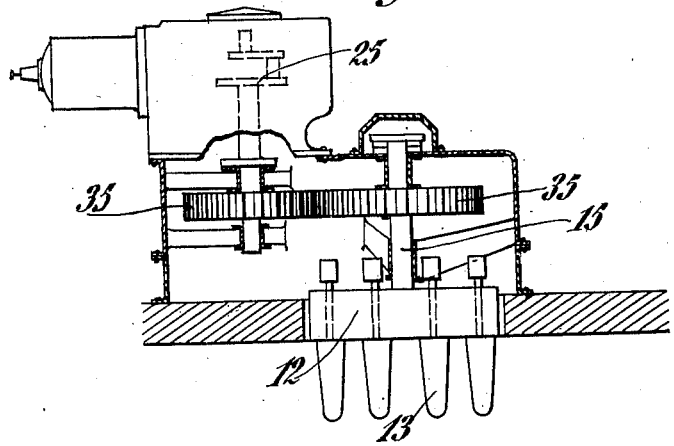
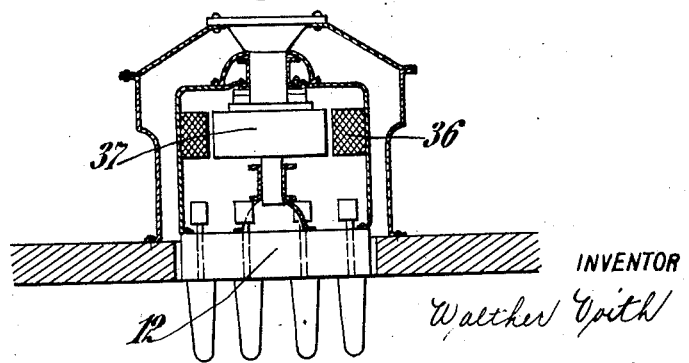

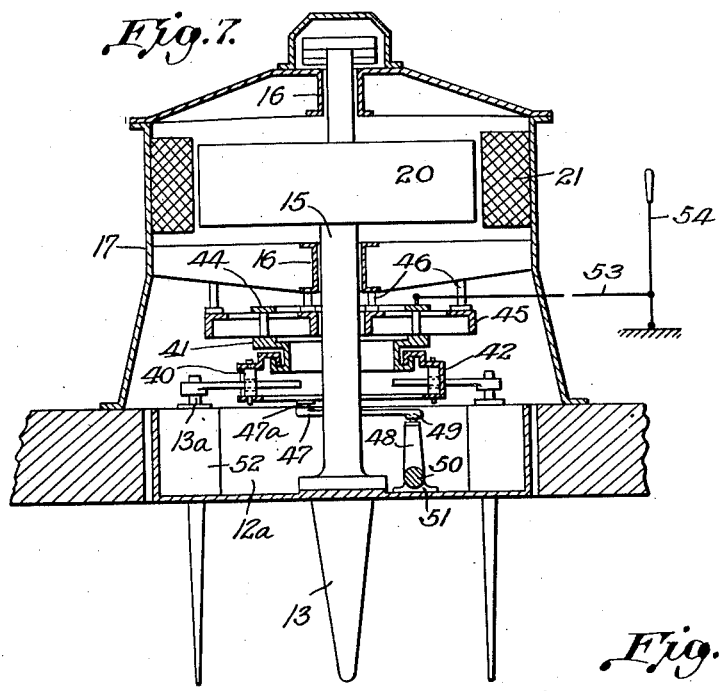
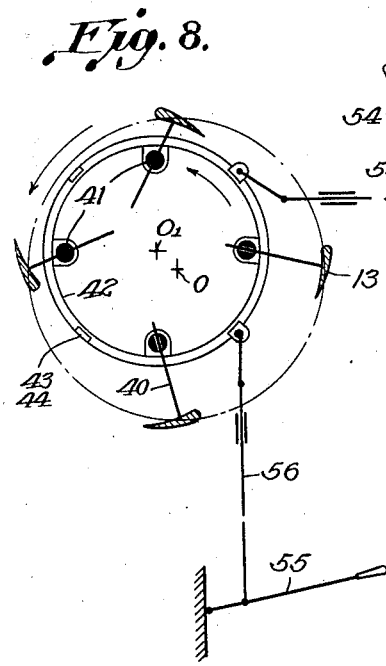
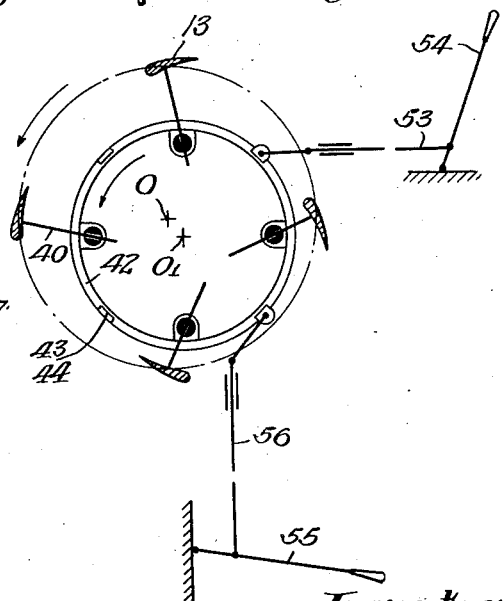

Patented Aug. 15, 1933

1,922,606

UNITED STATES PATENT OFFICE 1,922,606

METHOD AND MEANS FOR PROPELLING AND STEERING WATER OR AIR SHIPS

Walther Voith, St. Polten, Austria

Application September 22, 1931, Serial No. 564,311, and in Germany September 25, 1930

6 Claims. (Cl. 170—148)

In the maneuvering of larger ships driven by reciprocating piston engines, Diesel engines, or turbines, in harbors or rivers, it has been necessary to utilize tugboats and the like to bring such ships to and from, or, into their piers. This is due to the fact that such power means as reciprocating piston engines, Diesel engines, or turbines do not present effective operation from that corresponding to their working speeds, down to such low speeds as to conform to the slow movements of the ships in the maneuvering referred to. Attempts have been made to overcome these very serious difficulties by shutting down the main power and utilizing auxiliary power as electric motors supplied by storage batteries, or by special generating dynamos requiring in turn separate power machines. To give the required range of speeds, such electric motors cannot be of the alternating current type, but must utilize a direct current installation which has many disadvantages, to say nothing of the high cost of installation and operation, and the losses in efficiency which every electrical power transmission brings about. Thus, while ships, particularly of high tonnage, require exceedingly high expenditures for the generation of power, all this is of no avail to maneuver the ships under such low speeds as are required in harbors, river outlets, or even on the high seas in fog, etc. The Diesel engine, due to its relative high efficiency, is finding more and more favor with the shipbuilding engineers, but it has a small range in variation of speeds, and attempts to reduce the speed beyond a point varying relatively inconsiderably from that of its average normal, have resulted in failure to ignite the atomized fuel, and hence a stoppage of the engine, which in narrow waters is attendant with the greatest danger to the entire ship. So also, combustion power engines of the rotary type have a relatively narrow range of speed variation from their rated speed, and while having many advantages find application only in such cases of power driven units which operate at substantially constant speed commensurate with the average normal speed of the power driving unit. For speeds varying from zero to normal or above, such valuable power units, as Diesel engines, rotary combustion engines, gas turbines, steam engines, etc. are necessarily valueless.

The object of the invention is to seek to solve the problem of utilizing such narrow speed range power units in the shipbuilding art, whether water or air, and consists in the application to the rotor constantly driven by such a power unit, within the range of its average normal speed, of means variable in respect to the speed desired to be given the ship, such motor being inboard of the ship, and such means being outboard of the ship, and contacting with the resisting fluid in which the ship moves, whether air or water. Under continuous rotation of the supporting rotor, at the speed of the driving power unit without any considerable range from its normal speed, the variable blades may be changed to any speed desired from zero to the highest forward and at intermediary speeds therebetween, or from zero to the highest rearward and at intermediary speeds, or at zero speed of the ship, or steering left or right, forward or rearward, air or water, maintaining however the continuous rotation of the blades in the fluid at the normal constant speed of the driving power unit.

The invention consists also in the combination of a standard power unit of small speed range variation with a blade supporting rotor moving substantially at the same speed, and means for varying the position of the blades in respect to the rotor cyclically during its rotation, for imparting to the ship any desired speed forward or rearward, or standstill, or steering, during constantly continuous rotation of the rotor and like operation of the driving power unit.

The blades referred to are preferably those which are wholly or almost parallel to the vertical axis of the rotor, and which blades during the rotation of the wheel or rotor move relatively to this rotor, and independently thereof, and are all impinged by the water (or impinge upon the water) principally normal to the direction of the axes of the blades. Such blades enable both a propulsion and steering to be given to the ship. In the case of swingable blades having a cyclic disposition in respect to the rotation of the rotor, any desired propulsion between zero and maximum, either rearward or forward, or a left or right steering, forward or backward, can be obtained. The power applied to move the blades independently of the rotor, is independent, preferably, of the power applied to move the rotor or blade supporting wheel, and heretofore the power unit for driving the rotor was separate from the rotor with speed reduction or increasing transmission means interposed therebetween.

A specially desirable arrangement embodying the invention is the utilization of one or more blade wheel propellers built into the stern or aft of the ship, with vertical or almost vertical axes, and propelled from one or more vertical axis motors (or almost vertical) either directly or by means of a transmission translation mechanism. As such power units, power units having a narrow range of speed variation can be used. Intermediate propeller shafts between the shaft of the blade wheel and power unit are entirely dispensed with and expensive and repair-requiring couplings are also dispensed with. Thus, the invention herein described enables the utilization in ships (air or water) of motors in which the revolutions are not at all variable, or if variable then only in small or narrow limits, as for instance, an alternating current electric motor, rotary combustion engines including such using a fluid medium, a steam turbine, gas turbine, or Diesel engine, or the like.

The invention combines the advantages of a space and weight saving construction, easily accessible and self-contained, with a universal regulation of the power of the prime mover and propulsion respectively. The invention enables, even with a ship standing still, the power unit or prime mover and the propulsion rotor and blades, to continue to run at normal speed. A variation of the position of the blades then changes the speed of the ship, and/or effects the steering. Hence, the invention makes the use of pusher boats or tub boats in maneuvering large ships entirely unnecessary.

The invention will be more fully described hereinafter, and embodiments thereof shown in the accompanying drawings and the invention will be finally pointed out in the appended claims.

In the accompanying drawings,—

Figure 1 shows a diagrammatic form of one embodiment of this invention, in which the rotor of the blade wheel and the prime mover are combined and parts of each are supported, whether stationary or rotary, by the same structural elements;

Fig. 2 shows another embodiment of this invention;

Fig. 3, still another embodiment, utilizing a Diesel engine, being shown in plan;

Fig. 4, the same structure as shown in Fig. 3, but now in elevation;

Fig. 5 shows another embodiment of the invention which employs a transmission mechanism between the prime mover and the blade wheel, and Fig. 6 shows still another embodiment in which the alternating current motor field rotates with the rotor of the blade wheel and in which a fixed armature is provided.

Fig. 7 is a sectional view of a propeller showing means to shift the blades.

Fig. 8 is a schematical plan view of the shift ring and blades in one position; and Fig. 9 is a schematical plan view of the shift ring and blades in another position.

Similar characters of reference indicate the same parts throughout the various views.

Referring to the drawings, and more particularly to Fig. 1, the hull of the ship as indicated by 10, which hull has an opening 11 adapted to be substantially closed with allowance for suitable clearance, by the rotor of the blade propeller or the blade wheel 12. This rotor 12 supports a plurality of blades 13, the shafts 14 of which are suitably supported in bearings arranged in the rotor 12. The shafts are connected with suitable mechanism as suitable means for example, to rotate the shafts in partial revolution only, that is, to swing the shafts and the blades supported thereby from a certain definite position in respect to the periphery of the rotor to another position in respect thereto, whereby the respective blades are shifted in position relatively to the rotor while the rotor completes its revolution so that by the shifting of the position of the blades which are shifted independently of the rotation of the rotor, the blades present various angular positions to the medium, be it water or air. When all of the blades are in one position, there is no power exerted upon the ship. When they are placed in another position, the ship is driven forwardly, when in another position, the ship is driven rearwardly, and certain other positions bring about an entire left turn or an entire right turn, or part left with forward propulsion or part right with foward propulsion, and similarly with rearward propulsion. This shifting of the blades can be brought about, while the rotor is rotating at its normal speed. Once the blades are shifted to one position, they swing synchronously-periodically with the rotation of the rotor 12, but are shiftable to any other position independently of the rotation of the rotor, changing thereby the amplitude and phase.

An explanation of the operation of the blades and their connections, the mechanism thereof forming no part of this invention, is as follows:

The propeller blades 13 are supported by blade bearings 52 which are rigidly connected with the propeller hub 12a. The blade stems 13a of the blades 13 are provided with suitable operating rods 40, which extend through suitable openings in ring 42 and slide in bearings 41 which are supported in ring 42, in such a manner that the bearings can swing around their vertical axes. The ring 42 rotates synchronously with the propeller rotor or hub 12a. To enable this to be carried out, a suitable flexible connection between the hub 12a and the ring 42 is arranged, which consists of a bearing member 51 secured to the hub 12a, connected with a lever 48, rigidly connected with the shaft 50, and having at the other end a universal joint 49 with a rod 57 horizontally arranged, pivoted by the universal joint 47 to a pin 47a on the ring 42. In the opposite half of the propeller rotor 12a, which is not shown in Figure 7, identically the same flexible connection between rotor 12a and ring 42, as well as a similar bearing member are provided, shaft 50 being common to both connections. The ring 42 is supported by a ring 43, in turn rigidly connected with a ring 44, thus forming a double ring, and ring 42 is relatively rotatable in respect to ring 43, the ring 43 not participating in the rotation of the propeller hub. Rings 43 and 44 and thereby ring 42 are shiftable to any desired position eccentric to the propeller axis, while the propeller is in operation. In Fig. 7, the ring 42 is shown in zero position, that is, its axis is concentric with that of the propeller; that is, the point $O_1$ of Figure 8, coincides with point $O$. The rings 43—44 can be shifted to eccentric position relative to the propeller center or axis, by means of operating levers 54 and 55, in turn connected with the rings 43—44, by levers 53 and 56. Thereby the ring 42 is also displaced to the same eccentric position relative to the propeller rotor axis. Such positions are shown in Figs. 8 and 9. In Fig. 8, the center $O_1$ of the ring 43 is disposed eccentrically in respect to center $O$ of the propeller shaft in one direction and in Fig. 9, the center $O_1$ of the ring 43 is disposed eccentrically in respect to the propeller shaft $O$ in another direction, these dispositions depending upon the position of levers 54 and 55. It will be noted from Figs. 8 and 9, that with the disposition of point $O_1$ in respect to $O$, different blade positions are obtained, with each position of the ring 42, so that by shifting the double ring 43—44, which does not rotate with the propeller, any desired action of the propeller can be obtained, while the propeller is in operation.

The rotor has a shaft 15. In the embodiment shown this is shown in vertical position and the shaft is in suitable bearings 16 supported by the frame 17 secured at 18 to the hull 10 of the ship. The shaft 15 supports also a rotor 20 of an alternating current motor and the stator 21 being suitably supported by the frame 17, which frame as before stated, supports also the shaft 15. By this construction, a part of each unit thus combined, coacts with the other, in that certain rotary parts of both units are unitary and certain stationary parts of both units are unitary, each being suitably supported by common means. An alternating current motor has a normal speed with very small ranges of variation therefrom and the use of such a motor in shipbuilding construction may be had by the combination of parts just described in that as the motor exerts its power upon the shaft 15 and rotates the shaft 15 at the normal speed of the motor, subject to such small variations as are regulated by the regulator on the engine creating the electrical motive power for this motor, and in consequence the rotor of the blade wheel or propeller 12 is thereby rotated at the same speed as the motor. During this constant operation of the electric motor and the rotor or blade wheel, which is maintained at all times, the ship may be brought to standstill, notwithstanding the continuation of the operations just described, by merely shifting the position of the blades 13 in respect to the blade wheel or the ship may be driven at any speed ahead or rearward or may be steered in any direction by the shifting of the blades 13, during the continuation of the rotation of the rotor and the continued operation of the electric motor or prime mover 21, at its normal speed.

Referring now to Fig. 2, there is shown diagrammatically, the combining of the rotor of the blade wheel 12 with a steam, water or gas turbine indicated by 23, the action of the turbine being upon the shaft 15 of the rotor or blade wheel and either of these turbines operating at constant speed according to their normal or rated speed with only slight variations therefrom, if any. Here again, while the ship enters a harbor and is being docked, the large machinery used for forward propulsion while on the high seas, may be continued to be utilized by allowing it to run at its normal speed and the change in the speed of the ship is brought about by the shifting of the blades, as also the steering, as heretofore explained.

In Figs. 3 and 4 is shown respectively, a plan and an elevation, also rather diagrammatically, of a propeller having shiftable or swingable blades and a Diesel engine. The details of the engine itself need not here be described as they are well known, as also the steam or water or gas turbine as referred to in connection with Fig. 2, but the operative relation between the crank disc of the prime mover or Diesel engine and the shaft 15 of the blade wheel 12 is shown to indicate that the blade wheel 12 operates at the same speed as the crank disc 25. The crank disc is shown as connected with the connecting rod 26, piston rod 27, piston 28 in the cylinder 29, a suitable frame 30 supporting the engine parts. A suitable bearing 31 is shown to support the shaft 15 in horizontal as well as vertical direction. The blades are operated by shifting them in their relations to the blade wheel by means such as are described in connection with Fig. 1 or any other suitable means adapted for this purpose.

In Fig. 5, a similar construction is shown, excepting that between the crank disc 25 of the prime mover and the shaft 15 of the blade wheel 12, suitable gearing 35 is interposed. This gearing may be of such character as to either increase the rotation of the rotor or blade wheel 12 or decrease it or the transmission can be such that the rotor 12 has the same speed of rotation as the crank wheel 25, the transmission gearing being used in such cases where the construction of the ship makes it impossible to place the prime mover immediately above the blade wheel as shown in several of the embodiments. The gearing is of such a character, that the speed of the prime mover which is constant, with slight variations only, is substantially the same or in synchronism with the speed of the blade wheel so that both rotate or operate at substantially the normal speed without any marked range of variation, even during the standstill of the ship in the event the blades are in a position corresponding thereto. These gears are not used to change the ratio of speed between the prime mover and blade wheel, which ratio, in accordance with this invention, remains constant at all times once the ship is designed.

In Fig. 6 another embodiment is shown, which may find its application in certain ship constructions, allowing small space in which the rotor or blade wheel 12 has rotating therewith the rotor of an alternating current motor which rotor is indicated by 36. In this case, the armature 37 would be stationary or fixed. In this case or in other cases of similar construction, a part of the rotor of the electrical machine of substantially constant speed is made substantially one mechanical construction with the blade wheel itself.

As shown, by uniting in the constructing of the parts of the power unit and parts of the propeller, whether stationary or rotating, both machines may, for example, be mounted upon the same shaft and bearings, and a very efficient and self-contained unit be obtained.

It will also have been seen that in the art of ship propulsion, a novel step has been described which consists in maintaining full normal speed of the main power unit having a narrow speed range variation, during the standstill of the ship or at speeds from zero to full speed ahead or astern or lateral variations thereof by varying the position of the blades relative to the rotating rotor or blade wheel, the rotor or blade wheel moving at substantially the same or synchronous speed of the power unit and the relative swinging movement of the blades being independent of the rotor rotation and speed of the power unit. It will also have been seen that the novel combination of the parts has been proposed in that a power unit having a constant speed is made effective at all times and the large capital invested in the operating or propulsion machinery of a ship may be fully utilized at all times instead of being limited only to substantially forward or backward movement as is the case at the present time. The invention permits the operation of such ships in harbors or river outlets or while docking, in that the main engines of the ship or prime movers continue to operate at their normal speed while the speed of the ship is changed to any amount from zero to substantially that normal speed of the prime mover or steering may be had in any direction.

I have herein referred to several practical embodiments of my present improvements which have given excellent results in actual use. Nevertheless, it will be understood that insofar as the essential features of my present disclosure are concerned, the same may also be embodied in various other alternative structural forms, and I therefore, reserve the privilege of resorting to all such legitimate changes in the form, construction and arrangement of the several parts thereof as may be fairly embodied within the spirit and scope of the appended claims.

I claim:

1. In a ship propelling construction, the combination of a power unit of narrow range in speed variation, a blade supporting rotor, a central shaft for the rotor extending into the power unit and forming the shaft thereof for rotating at the same speed or in synchronism therewith, a casing support in the hull of the ship for said central shaft and power unit for permitting rotation of the blade supporting rotor in the same plane as the stream line of the ship, and means independent of the power unit and of the rotor operating means, for swinging the blades from zero position with respect to the rotor to any other position with respect thereto, whereby any variation in the position of the blades varies the direction and speed of propulsion, under maintenance of substantially the constant, continuous speed of the power unit and rotor.

2. In a ship construction, the combination of a substantially vertical axis power unit of narrow speed range, and of substantially constant speed, a blade wheel rotor in the hull of the ship and having its axis in alignment with the axis of the power unit, actuating means mechanically uniting said axes for driving the rotor on the operation of the power unit, and means adjustable independent of the rotation of the blade wheel rotor for changing the position of the blades with respect to the blade wheel rotor to vary the direction and speed of propulsion of said ship.

3. In a ship construction, the combination of a power unit having a rotating shaft centrally thereof, a blade wheel rotor having a rotary shaft centrally thereof, the shaft of the power unit and of the blade wheel rotor being in connection with each other, a supporting casing in connection with the hull of said ship for retaining the blade wheel rotor in the same plane as the hull line, and means adjustable independent of the rotation of the blade wheel rotor for changing the position of the blades from alignment with the direction of movement of the blade wheel rotor to vary the direction and speed of propulsion of said ship.

4. In combination, with a rotatable blade wheel rotor set in the stream line of the hull of the ship and blades at substantially right angles to the plane of rotation of the rotor and the axis of the blades being vertical to the line of thrust of the blades upon the fluid medium, of a power unit of small range speed variation from its normal speed, mechanically united with the blade wheel rotor to rotate the same in synchronism therewith with similar narrow range speed variation, a support on the hull for the power unit and blade wheel rotor for supporting the same upon the hull, the blades of the wheel being movable and shiftable with respect to their rotor independently of the speed of rotation of the motor.

5. In a ship propelling construction, the combination of a hull wall having an opening therein, with a self-contained power unit consisting of a blade wheel rotor in said opening having blades disposed at substantially right angles to the plane of rotation of the blade wheel rotor, and the axis of each blade being substantially vertical to the line of thrust of the blades upon the fluid medium and extending into the fluid medium from the hull line, a shaft for said blade wheel rotor, a prime mover of narrow range in speed variation, a shaft for said prime mover, means connecting the shafts for rotating the blade wheel rotor by the prime mover rotor, a supporting casing on the hull wall for the prime mover rotor and for the blade wheel rotor for supporting the shafts of the blade wheel rotor and of the prime mover rotor, and means in connection with the blades adjustable independently of the movement of the prime mover and of the blade wheel rotor, for swinging the blades from zero position with respect to the rotor to any other position with respect thereto, whereby any variation in the position of the blades relative to the blade wheel rotor varies the direction and/or speed of propulsion, under maintenance of substantially the constant continuous speed of the prime mover and blade wheel rotor.

6. A method of propelling and steering a ship having a prime mover of narrow range speed variation under maintenance of its full normal speed, which consists in continually subjecting the fluid medium to a cutting action in a circular path at a constant speed within such variation of the full normal speed, and imposing during such constant speed cutting action upon the fluid medium thrusting actions creating forces in any desired direction and of any intensity from zero to maximum, whereby reacting forces are created changing the course of the ship in any direction and the speed of the ship from zero to full speed, during the beforementioned speed of said prime mover and of said cutting action of the fluid medium.

WALTHER VOITH.